United States Patent
Kokaska et al.

(10) Patent No.: US 9,654,804 B2
(45) Date of Patent: May 16, 2017

(54) REPLACING VIDEO FRAMES IN A TRANSPORT STREAM

(71) Applicant: Vigor Systems Inc., La Jolla, CA (US)

(72) Inventors: Frederick Kokaska, Poway, CA (US); Magnus Sörlander, La Jolla, CA (US); Janno Ossaar, Tallinn (EE)

(73) Assignee: VIGOR SYSTEMS INC., La Jolla, CA (US)

(*) Notice: Subject to any disclaimer, the term of this patent is extended or adjusted under 35 U.S.C. 154(b) by 227 days.

(21) Appl. No.: 14/476,457

(22) Filed: Sep. 3, 2014

(65) Prior Publication Data

US 2016/0065994 A1 Mar. 3, 2016

(51) Int. Cl.

| | |
|---|---|
| *H04N 19/89* | (2014.01) |
| *H04N 19/88* | (2014.01) |
| *H04N 19/68* | (2014.01) |
| *H04N 21/2187* | (2011.01) |
| *H04N 21/234* | (2011.01) |
| *H04N 21/2343* | (2011.01) |
| *H04N 21/236* | (2011.01) |
| *H04N 21/2365* | (2011.01) |

(52) U.S. Cl.
CPC ............ *H04N 19/89* (2014.11); *H04N 19/68* (2014.11); *H04N 19/88* (2014.11); *H04N 21/2187* (2013.01); *H04N 21/2365* (2013.01); *H04N 21/23424* (2013.01); *H04N 21/23439* (2013.01); *H04N 21/23608* (2013.01); *H04N 21/234354* (2013.01)

(58) Field of Classification Search
CPC ........ H04N 19/68; H04N 19/88; H04N 19/89; H04N 21/2187; H04N 21/23424; H04N 21/234354; H04N 21/23439; H04N 21/23608; H04N 21/2365; H04L 65/607; H04L 65/80; H04L 65/602
USPC ....................... 375/240.26, 240.16
See application file for complete search history.

(56) References Cited

U.S. PATENT DOCUMENTS

| | | | |
|---|---|---|---|
| 6,480,537 B1 * | 11/2002 | Agrawal | H04N 21/235 375/240 |
| 6,771,657 B1 * | 8/2004 | Elstermann | H04N 7/52 370/465 |
| 7,068,719 B2 | 6/2006 | Liu et al. | |
| 7,620,073 B2 * | 11/2009 | Robinett | H04N 21/8547 370/477 |
| 8,732,786 B2 | 5/2014 | Drang et al. | |
| 2002/0041628 A1 * | 4/2002 | Andersson | H04N 21/23406 375/240.12 |

(Continued)

*Primary Examiner* — Behrooz Senfi
(74) *Attorney, Agent, or Firm* — Park, Vaughan, Fleming & Dowler LLP

(57) ABSTRACT

It is presented a splicing device for replacing video frames in a transport stream. The splicing device comprises a processor; and a memory storing instructions that, when executed by the processor, causes the splicing device to: receive the transport stream comprising frames of a first program stream and frames of a second program stream, and replace at least one of the frames of the second program stream with frames of a replacement program stored in a storage encoded at a plurality of different bit rates, wherein the frames of the replacement program are selected of from the plurality of different bit rates to comply with a maximum bandwidth of the transport stream.

20 Claims, 12 Drawing Sheets

(56) References Cited

U.S. PATENT DOCUMENTS

| | | | |
|---|---|---|---|
| 2006/0093045 A1* | 5/2006 | Anderson | H04N 21/23424 375/240.28 |
| 2007/0153914 A1* | 7/2007 | Hannuksela | H04N 21/23424 375/240.26 |
| 2009/0313652 A1 | 12/2009 | Connery et al. | |
| 2010/0128779 A1* | 5/2010 | Chatterjee | H04N 21/23424 375/240.12 |

* cited by examiner

REPLACING VIDEO FRAMES IN A TRANSPORT STREAM

TECHNICAL FIELD

The invention relates to a splicing device, method computer program and computer program product consistent with the present disclosure related to replacing video frames in a transport stream.

BACKGROUND

Replacement of video data contained in MPEG (Moving Picture Experts Group) program streams is well established. Normally MPEG programs are encapsulated within a MPEG Transport stream supporting many channels. A primary requirement is that data bandwidth of the Transport stream must be held below the capabilities of the transmission system. Thus when video data replacement occurs the defined bandwidth of the transmission system cannot be exceeded otherwise loss of all programs may occur at the receiving end due to lost data packets.

There are many situations where video replacement is required. For example news breaks may occur for local news that replace a national broadcast. Similarly local advertising may replace national advertisements in advertising breaks. Local programming is stored ready for play out at the appropriate time. However, in such cases, bit rates of the original program and replacement program can vary, meaning peaks of data occur differently because the bandwidth of video changes according to motion in the picture. Data packets in Transport streams are organized such that bandwidth utilization is often close to maximum, therefore additional variations by program replacement can result in excess bandwidth.

Video data replacement is often referred to as "splicing," as opposed to physical switching, since data is being replaced. In commercial products, 'Transport stream splicers' perform program replacement. This is usually achieved by de-multiplexing and re-multiplexing data packets in order to keep within transmission bandwidth limits. A presentation time stamp (PTS) and/or a program clock reference (PCR) may be altered for program streams.

It is much more difficult to splice variable bit rate programs as transport stream splicers perform a statistical analysis of on-going bandwidth requirements and adjust placement of data packets accordingly. Variable bit rate program replacement can result in transmission bandwidths being exceeded. In these instances it may be necessary to perform decoding of the video data to uncompressed form and re-encode the uncompressed video data dynamically at lower bit rates for the period that transmission bandwidth is exceeded. In this case, lower quality of video is created for a few frames, but provided the period is short, the lower quality video can be difficult to detect.

There are products that perform program replacement without de-multiplexing or re-multiplexing the transport stream data. However, there are disadvantages in these products in that these products rely on the use of constant bit rate program streams, and the program streams being spliced need to have similar bit rates if transmission bandwidth is close to the limits, which is typically the operating environment.

SUMMARY

It is an object to enable MPEG program replacement to occur within a MPEG Transport stream, allowing program replacement for existing variable bit rate programs.

According to a first aspect, it is provided a splicing device for replacing video frames in a transport stream. The splicing device comprises: a processor; and a memory storing instructions that, when executed by the processor, causes the splicing device to: receive the transport stream comprising frames of a first program stream and frames of a second program stream, and replace at least one of the frames of the second program stream with frames of a replacement program stored in a storage encoded at a plurality of different bit rates, wherein the frames of the replacement program are selected of from the plurality of different bit rates to comply with a maximum bandwidth of the transport stream. The transport stream can be an MPEG transport stream.

According to a second aspect, it is provided a method for replacing video frames in a transport stream, the method being performed in a splicing device and comprising the steps of: receiving the transport stream comprising frames of a first program stream and frames of a second program stream, and replacing at least one of the frames of the second program stream with frames of a replacement program stored in a storage encoded at a plurality of different bit rates, wherein the frames of the replacement program are selected of from the plurality of different bit rates to comply with a maximum bandwidth of the transport stream.

According to a third aspect, it is provided a computer program for replacing video frames in a transport stream, the computer program comprising computer program code which, when run on a splicing device causes the splicing device to: receive the transport stream comprising frames of a first program stream and frames of a second program stream, and replace at least one of the frames of the second program stream with frames of a replacement program stored in a storage encoded at a plurality of different bit rates, wherein the frames of the replacement program are selected of from the plurality of different bit rates to comply with a maximum bandwidth of the transport stream.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

Exemplary embodiments will now be described with reference to the accompanying drawings. The aforementioned accompanying drawings show by way of illustration and not by way of limitation, specific exemplary embodiments and implementations. It is to be understood that other exemplary embodiments and implementations may be used and that structural changes and/or substitutions of various elements may be made without departing from the scope of present disclosure. The following detailed description is, therefore, not to be construed in a limited sense. Additionally, the various exemplary embodiments as described may be implemented in the form of software running on a general purpose computer, in the form of a specialized hardware, or in the form of a combination of software and hardware.

As used in this specification and the appended claims, the singular forms "a", "an", and "the" include plural references unless the context clearly dictates otherwise. Thus, for example, references to "the method" includes one or more methods, and/or steps of the type described herein which will become apparent to those persons skilled in the art upon reading this disclosure and so forth.

The term "comprising," which is used interchangeably with "including," "containing," or "characterized by," is inclusive or open-ended language and does not exclude additional, un-recited elements or method steps. The phrase "consisting of" excludes any element, step, or ingredient not specified in the claim.

Unless defined otherwise, all technical and scientific terms used herein have the same meaning as commonly understood by one of ordinary skill in the art to which this disclosure belongs.

Figure 1:
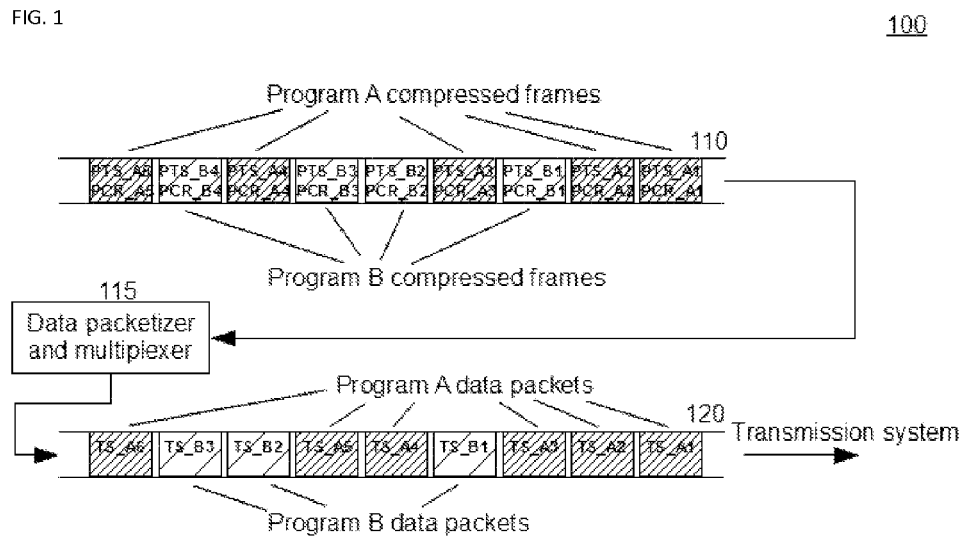
FIG. 1 illustrates a related art MPEG Transport stream environment.

FIG. 1 illustrates a MPEG Transport stream environment. As shown in FIG. 1, an MPEG Transport stream environment 100 can contain multiplexed data packets from several programs. In this example, two MPEG programs are contained in an MPEG Transport stream 120. The MPEG Transport stream 120 is traditionally used to transmit digital TV to set top boxes via cable, radio masts or satellite. Thus, the term "program" refers to generally to transmitted content, and may refer, for example, to a TV program.

FIG. 1 shows two programs, Program A and Program B, which may be packetized elementary streams (PES) with each compressed frame having an associated presentation time stamp (PTS) and program reference clock (PCR). Thus, there is a PTS/PCR sequence for Program A and one for Program B. The MPEG compressed frames 110, including Program A and Program B, are input into a data packetizer and multiplexer 115 which generates the MPEG Transport stream 120 of packetized digital data (Transport stream packets) which are smaller data segments than the compressed frames. Program A and program B Transport stream packets are multiplexed to spread the program bandwidth load evenly within a maximum allowable bandwidth of the transmission system. Receiving equipment can assemble data packets of the Transport stream to recreate the compressed frames of Program A and the compressed frames of Program B using established protocols. It will be understood that the following descriptions often make references to compressed frames for concision and ease of description. However, those of ordinary skill in the art will understand that manipulation of data packets that comprise the compressed frames may occur using packet header information that associates packets with compressed frames, and that data may remain as packets without fully assembling compressed frames of which the packets are a part.

Figure 2:
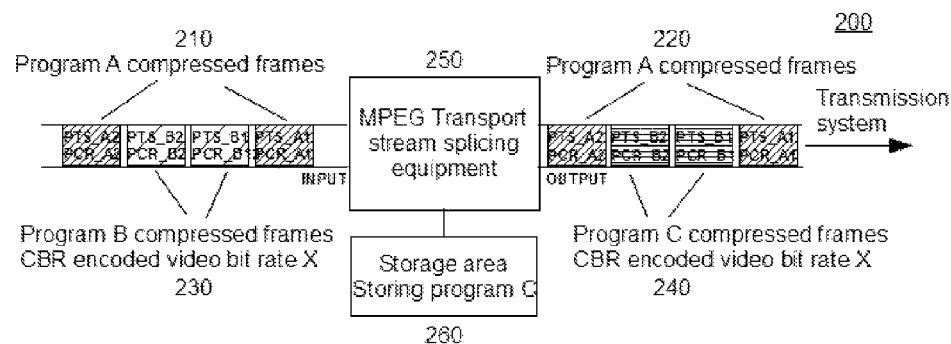
FIG. 2 illustrates related art program replacement.

FIG. 2 illustrates related art program replacement. The related art program replacement uses a storage area 260 which stores a replacement program, program C. An MPEG Transport stream splicing device 250 receives compressed frames of program A 210 and compressed frames of program B 230 at its input. The storage area 260 stores compressed frames of the program C. The splicing device 250 processes the frames, and outputs a streamed program in which compressed frames of program B 230 are replaced with the compressed frames of program C which are stored in stored archive 260. The program replacement may be performed by data packet replacement. Thus, the output includes Transport stream data packets which include compressed frames from program A 220 and compressed frames from program C 240. The original program B 230 and the replacement program C 240 are encoded similarly at a constant bit rate (CBR) having bit rate X. The MPEG Transport stream splicing device 250 can perform the program replacement using transport stream data packets without de-multiplexing and re-multiplexing data packets.

Figure 3:
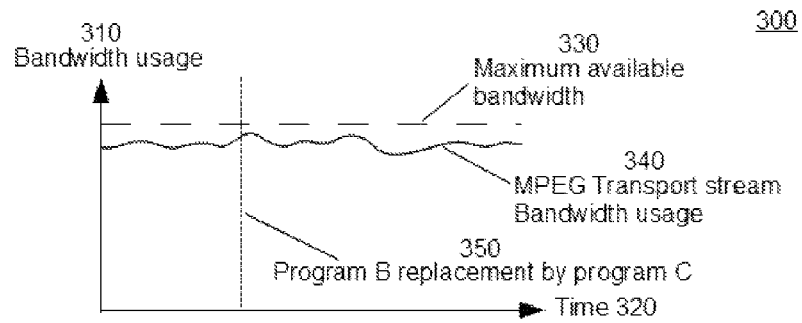
FIG. 3 illustrates bandwidth usage for the related art program replacement of FIG. 2 that uses constant bit rate programs.

FIG. 3 illustrates bandwidth usage for the related art program replacement of FIG. 2 that uses constant bit rate programs. FIG. 3 shows bandwidth usage 310 versus time 320. At a time 350, when program replacement occurs, bit rate variance is held within (i.e. not exceeding) the maximum available bandwidth 330 because program B and program C have similar bit rates. Thus MPEG Transport bandwidth usage 340 does not exceed the maximum available bandwidth 330 over time.

Figure 4:
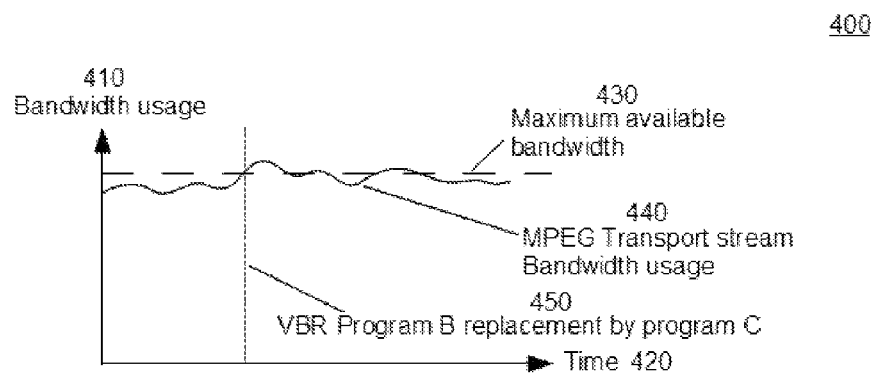
FIG. 4 illustrates bandwidth usage for related art program replacement using variable bit rate (VBR) programs.

FIG. 4 illustrates bandwidth usage for related art program replacement using variable bit rate programs. FIG. 4 shows bandwidth usage 410 versus time 420. In this case the related art program replacement uses variable bit rate (VBR) program. In this instance, the bit rate of the programs varies over time and is not predictable. At the time when program replacement of VBR Program B occurs 450, the maximum available bandwidth 430 is exceeded by the MPEG Transport Stream bandwidth usage 440. Even if the data packets of the MPEG Transport stream 440 are completely de-multiplexed and re-multiplexed, bandwidth may still be exceeded. In the related art, the solution to this bandwidth overflow is to decompress the video that is causing overflow with a decoder and re-encode some frames of the replacement program at a lower bit rate. This method requires significant computing power and possibly dedicated electronic processing hardware.

Figure 5:
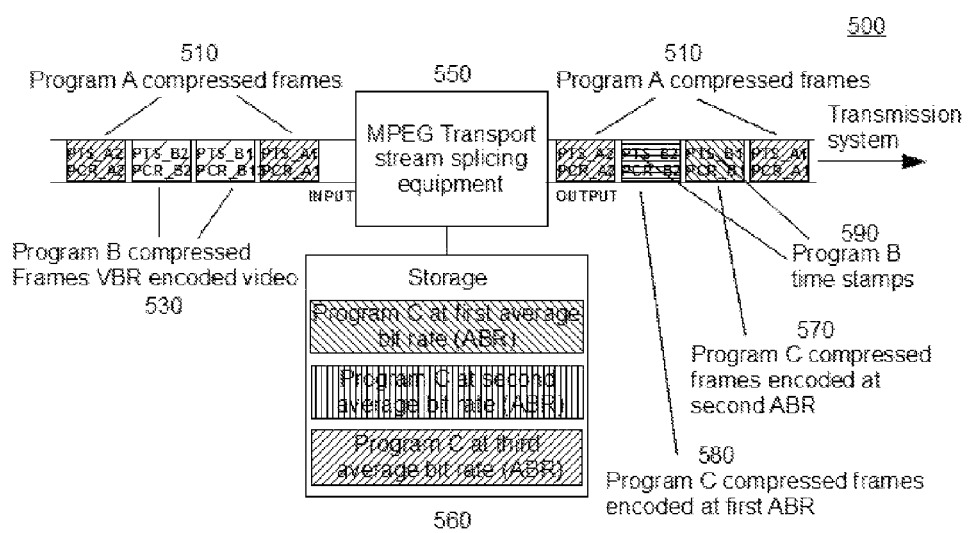
FIG. 5 illustrates program replacement according to an exemplary embodiment.

FIG. 5 is an illustration of an example of a configuration of a program replacement system according to an exemplary embodiment. A system 500 shown in FIG. 5 includes an MPEG transport steam splicing device 550 and a storage 560. The splicing device 550 has a transport stream input which includes data packets of compressed frames of program A 510 and compressed frames of program B 530. The storage 560 stores compressed frames of program C which have been encoded at a plurality of different bit rates.

In the example shown in FIG. 5, the storage 560 stores compressed frames of program C that have been encoded at a first average bit rate (ABR), compressed frames of program C that have been encoded at a second ABR, and compressed frames of program C that have been encoded at a third ABR. The first ABR may be higher than the second ABR, and the second ABR may be higher than the third ABR. In other words, compressed frames of program C are stored at a plurality of average bit rates which are different from one another. While FIG. 5 shows the storage 560 storing the program C encoded at three different bit rates, this is only an example, and one of ordinary skill in the art will understand that the number of bit rates may be more or less than three. Additionally, while FIG. 5 shows one program—program C—stored in the storage 560, additional programs are contemplated and may be stored in a similar manner to program C. The splicing device 550 processes the frames, and outputs a streamed program in which compressed frames of program B 530 are replaced with the compressed frames of program C of different bit rates that are stored in the storage 560 in order to maintain transmission bandwidth. Thus, in the example shown in FIG. 5, the output from the splicing device 550 includes Transport stream data packets which include compressed frames from program A 510, and compressed frames of program C at the first ABR 580 and compressed frames of program C at the second ABR 570 in place of compressed frames of program B 530.

In the system of FIG. 5 where program B is replaced by program C, similarly encoded versions of program C at differing bit rates are available in the storage 560. That is, the encoded versions of program C that are stored in storage 560 are similarly encoded to each other, except for being encoded at different bit rates. As shown in FIG. 5, the first frame of program B 530 (i.e., B1) is replaced by a frame of program C encoded at the second ABR 570 which is a medium bit rate. The second frame of program B 530 (i.e., B2) is replaced by a frame of program C encoded at the first ABR 580 which is encoded at a higher bit rate than the frame encoded at the second ABR 570.

When program B frame replacement occurs at 570, 580, the output time stamps PTS_B1/PCR_B1 and PTS_B2/PCR_B2, respectively, are unchanged as shown at in the time stamps being program B time stamps 590.

Figure 6:
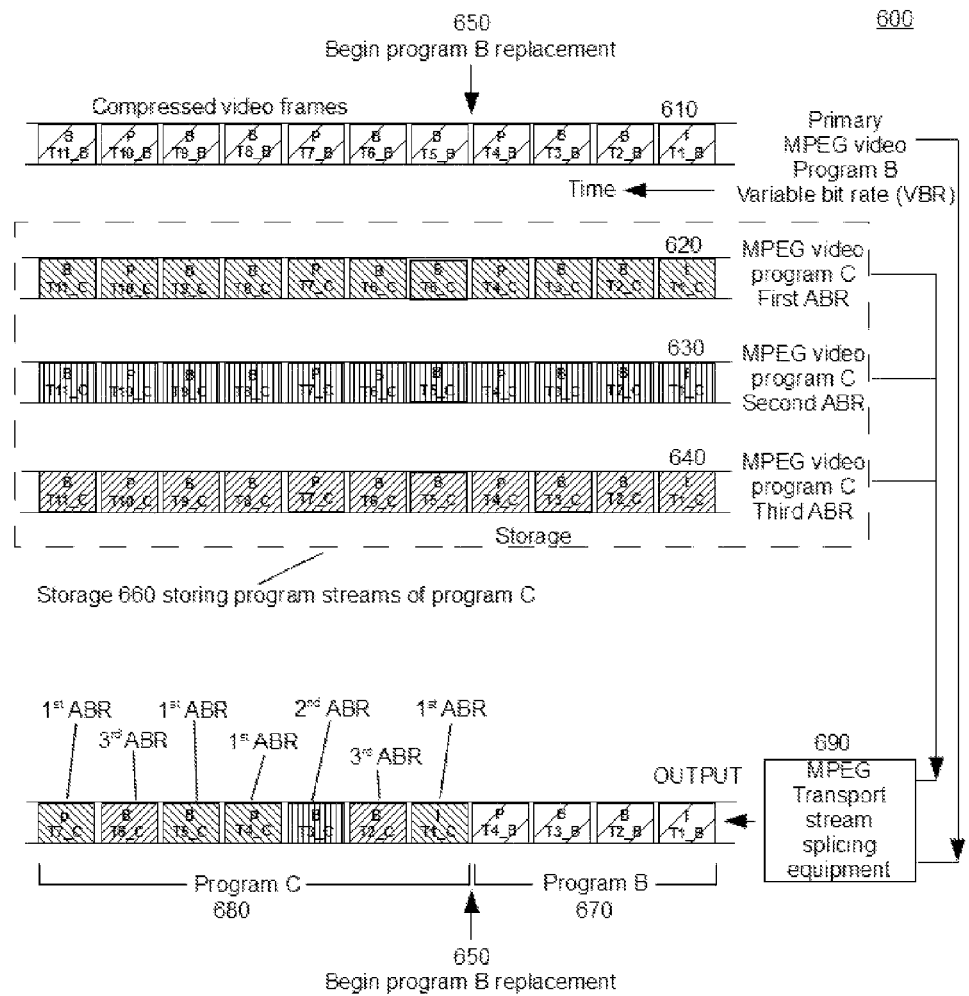
FIG. 6 illustrates the program replacement system of FIG. 5 in more detail.

FIG. 6 illustrates the program replacement system of FIG. 5 in more detail. As shown in FIG. 6, storage 660 includes compressed frames of program C encoded at a plurality of different bit rates. For example, storage 660 includes compressed frames of program C encoded at the first ABR 620, compressed frames of program C encoded at the second ABR 630, and compressed frames of program C encoded at the third ABR 640. Thus, since compressed frames of program C are encoded and pre-stored at a plurality of different bit rates, frames encoded with different bit rates may be used for each frame. As with the example shown in FIG. 5, the number of programs and the number of bit rates for each program are not particularly limited. While FIG. 6 shows each of the replacement MPEG program streams 620, 630, 640 encoded using an average bit rate (ABR), embodiments presented herein are not limited to this. Rather, the replacement MPEG program streams 620, 630, 640 may be encoded using different methods, for example using a constant bit rate (CBR) method, an average bit rate (ABR) method, a variable bit rate (VBR) method, etc.

FIG. 6 also illustrates that the replacement program C encoded at different bit rates, i.e., encoded at first ABR 620, second ABR 630, and third ABR 640, may be encoded such that the sequence of frame types (I, B, P) is similar or the same for frames encoded at each of the different bit rates. For example, FIG. 6 shows an exemplary embodiment in which the sequence is the same, i.e., replacement program C encoded at the first ABR 620 has sequence IBBPBBIBBPB, whereas replacement program C encoded at the second ABR 630 also has sequence IBBPBBIBBPB, and so forth. At the time program replacement begins at 650, program C 680 in the output of the splicing device 650 comprises frames from the first ABR 620, second ABR 630 and third ABR 640 encoded versions to maintain maximum Transport stream bandwidth requirements. Selection of frames encoded at the first ABR 620, the second ABR 630 and the third ABR 640 may occur on a frame by frame basis in order to construct the program C output 680.

Figure 7:
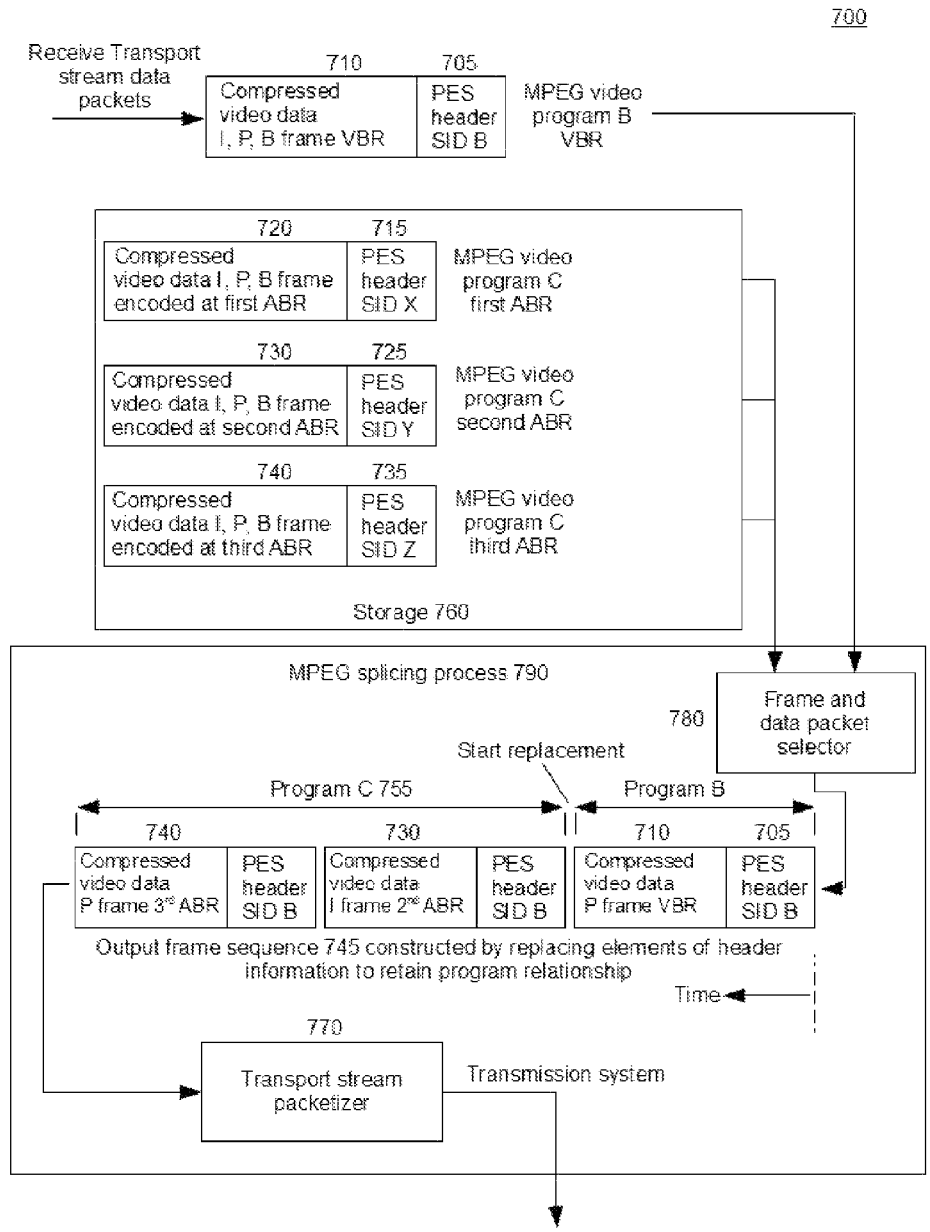
FIG. 7 illustrates header modification in a transport stream according to an exemplary embodiment.

FIG. 7 illustrates header modification in a transport stream according to an exemplary embodiment. FIG. 7 shows how elementary stream headers are modified when frames of a program stream are replaced within a Transport stream. MPEG programs are encoded with three different frame types: I, P and B. Each frame in a program has a header that provides information to downstream decoders that identifies the program. For example, as shown in FIG. 7, each program includes a PES header stream identifier (SID). MPEG Transport streams may contain multiple programs. Thus decoders can assemble individual programs from an input multiplex of many programs using the header information associated with each frame.

As shown in FIG. 7, storage 760 holds three programs encoded at different bit rates. As with the examples shown in FIGS. 5 and 6, the number of programs and the number of bit rates for each program are not particularly limited. Additionally, the programs in storage 760 may be stored as elementary streams or packetized elementary streams or packetized to be directly compatible with transport stream packets. A first average bit rate (ABR) encoded program 720 has a header 715 for each compressed frame type. The program stream identifier (SID) in this case is SID X. The second average bit rate (ABR) encoded program 730 has header 725 for each compressed frame type. The program stream identifier (SID) in this case is SID Y. The third average bit rate (ABR) encoded program 740 has header 735 for each compressed frame type. The program stream identifier (SID) in this case is SID Z.

As in the above description, the first ABR may be higher than the second ABR, and the second ABR may be higher than the third ABR. That is, first ABR>second ABR>third ABR. When program replacement occurs as illustrated in MPEG splicing process 790, elements of the header for the program of which frames are to be replaced may be retained so that the replacement frames indicate the same header information in order to be assigned to the same program. For example, the SID of the header for the frames which are to be replaced may be retained in the replaced frames. An output compressed frame sequence can be constructed from a mix of first ABR, second ABR, and third ABR encoded programs 745. In order for a downstream decoder to assemble a single program stream, each compressed frame of the output sequence has a header with the same identifier, SID B in this example.

Thus by this method when replacement of program B 710 starts, the data rate for individual frames can be adjusted to fit bandwidth requirements while maintaining the program B identity. Thus, the output frame sequence 745 from the frame and data packet selector 780 includes frames of program B including compressed VBR data 710 and a PES header SID B 705 before the start of replacement, and after starting replacement, the frames of program B are replaced by Program C frames 755 encoded at second ABR 730 but retaining PES header SID B, and Program C frames 755 encoded at third ABR 740 but retaining PES header SID B. The output frame sequence 745 is then sent to transport stream packetizer 770 for output to the transmission system.

Figure 8:
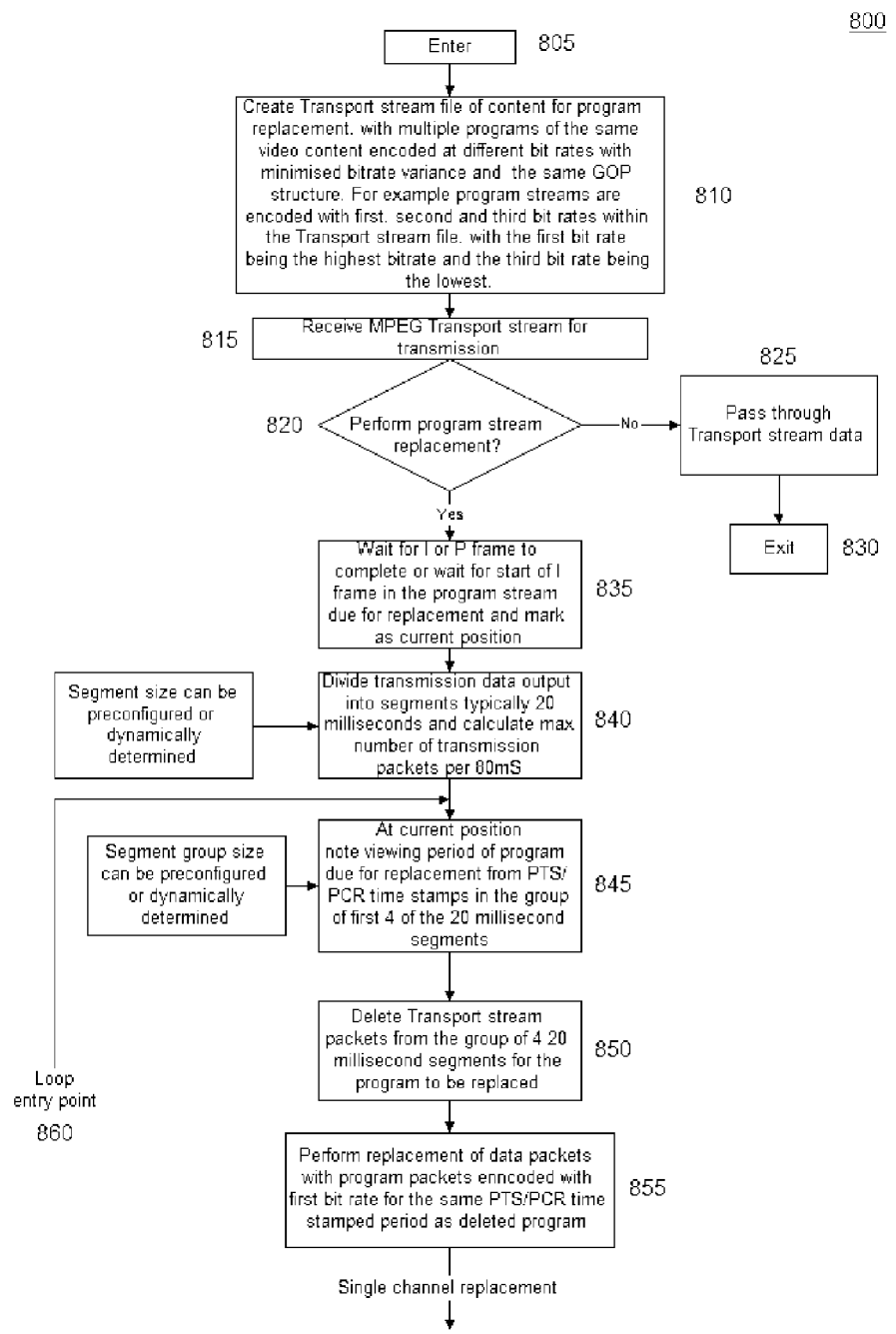
FIGS. 8-9 are a flowchart illustrating an example of a method according to an exemplary embodiment.
Figure 9:
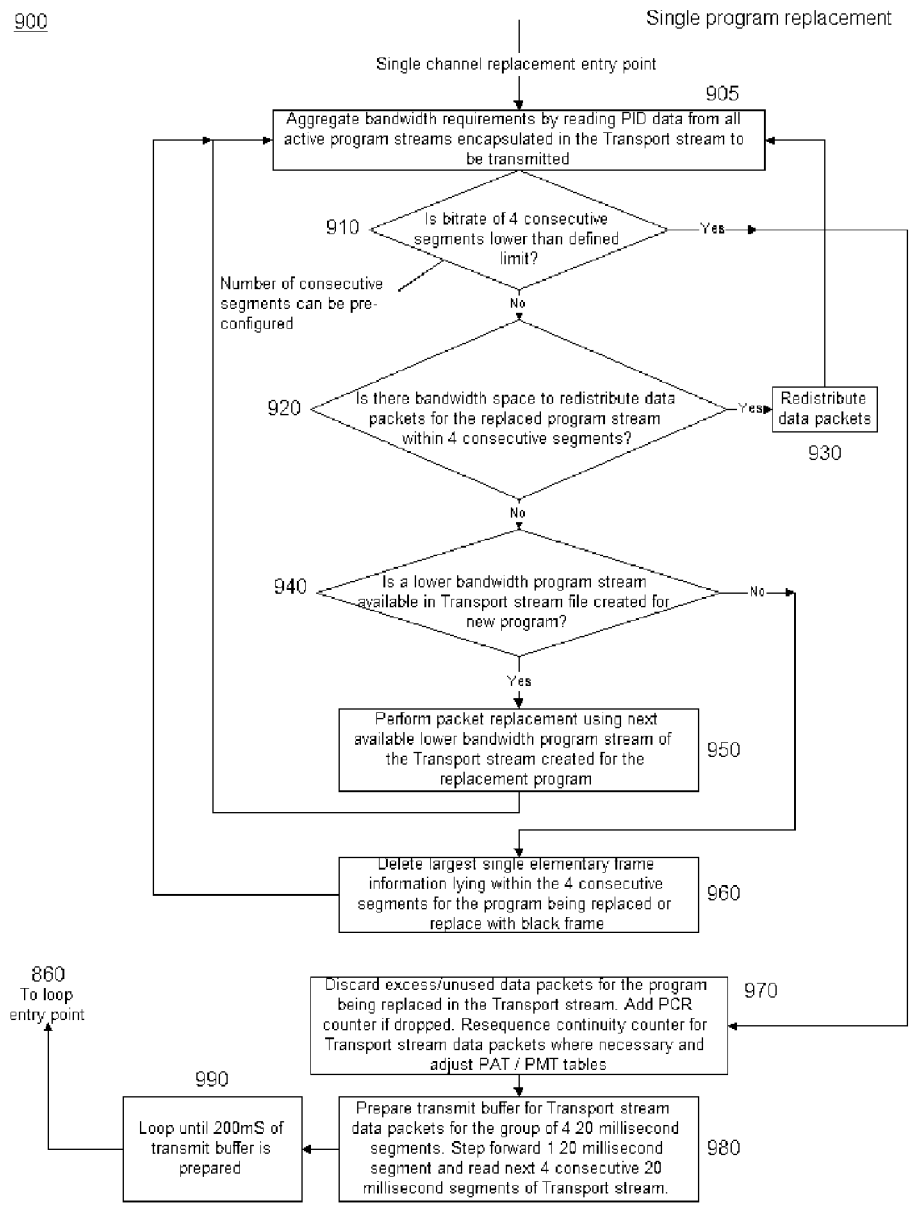

FIGS. 8-9 are a flow chart illustrating a process of a single program channel replacement according to an exemplary embodiment. The program used as replacement may first be encoded as similar versions at differing bit rates 810. For example, the program may be encoded and stored as a first version with a first bit rate, a second version with a second bit rate, and a third version with a third bit rate, where the first bit rate is higher than the second bit rate, and the second bit rate is higher than the third bit rate. The versions may have a same GOP (Group Of Pictures) structure. A received MPEG Transport stream 815 passes through the system 825 when it is determined that program replacement is not be performed in operation 820. On the other hand, when it is determined that program replacement is to be performed (operation 820, Yes), certain types of compressed frames in the original program stream are preferential points to begin program replacement 835. Transport stream data transmission is divided into segments typically 20 milliseconds 840. Segment size is configurable. A group of segments is used to obtain a presentation period of compressed frames from PTS/PCR time stamps for the program that is to be replaced 845. The existing compressed program frames' data packets in the group of segments are deleted from the Transport stream 850. The replacement program packets are placed into the Transport stream to fill the presentation period noted by the PTS/PCR timestamps. The replacement begins with highest bit rate version of the encoded replacements 855. The process of replacement occurs in groups of segments so a loop 860 can be constructed to perform the replacement.

After the replacement program is replaced, active packet identifiers (PID) in the group of segments are read 905 and the group of segments is evaluated for excess bandwidth usage 910. Packets have a defined size and the bit rate of the Transport stream is known, whereby the total used bandwidth can be calculated. If the group of consecutive segments has a bandwidth within limits (operation 910, YES), then the replacement data packets are used in the output Transport stream which is manipulated to accommodate the new data packets 970 and preserve the integrity of the data protocol. In operation 970 excess data packets from the original program are discarded which can result in lost PCR counter information. Lost PCR data is replaced together with re-sequencing of continuity counters (CC). PTS and PCR data for programs not under-going replacement remains unaltered.

In a Transport stream environment, an alternative to manipulating the stream ID (SID) for replacement video is to alter the Program Association Table (PAT) and Program Map Table (PMT). The PAT and PMT are tables that associate SID values with a specific program channel number that is presented to a viewer. The PAT and PMT tables can be dynamically altered so that video for a given program channel number can come from any available program streams, each with its own SID. In operation 970, PAT and PMT tables occurring in the group of segments are adjusted so that downstream decoders use the replacement data packets in place of the original program stream packets.

When the test for bandwidth compliance 910 shows bandwidth exceeded for any of the segments within the group (operation 910, No), a check is made for available bandwidth space elsewhere in the group of segments 920. If space is available (operation 920, Yes), data packets can be redistributed throughout the group to even out the bandwidth 930 and the process returns to operation 905 and a new calculation is performed.

Where no packet redistribution is possible (operation 920, No), a test is made to determine whether a replacement stream data is available at a lower bandwidth in operation 940. If a lower bandwidth version of the program stream is available (operation 940, Yes), the lower bandwidth version is used to perform packet replacement in operation 950 and the process returns to operation 905 to measure the aggregate bandwidth. When it is determined that no replacement stream having a lower bandwidth is available (operation 940, No), the process proceeds to operation 960. Operations 905 to 950 continue while there is excessive bandwidth until a lower bit rate version of the stream fulfils the bandwidth 970.

In operation 960, no lower bit rate versions of the stream exist. In this case the Transport stream would be corrupted so a palliative measure to preserve stream integrity is to delete frame information for the replacement program. This deletion can produce temporary visual artifacts in the downstream decoder for the program channel under-going replacement but integrity of the remaining programs in the Transport stream is maintained. An alternative to frame deletion is to replace the frame or frames as necessary with a black frame, typically an I frame. This maintains downstream encoding integrity and avoids picture break up artifacts.

When the group of segments is correctly formatted 970, the data packets of the group of segments can be passed to the transmit buffer to be prepared for output by system (operation 980). The next group of segments is selected for processing by stepping forward by one segment. Therefore the group of segments forms a sliding window of processing that moves through the data one segment at a time. The group of segments processing loop 860 continues until a chosen amount of transmit buffer data is built, for example, 200 mS in this case 990. The loop 860 can begin again when space for the next transmit buffer data is allocated.

Figure 10:
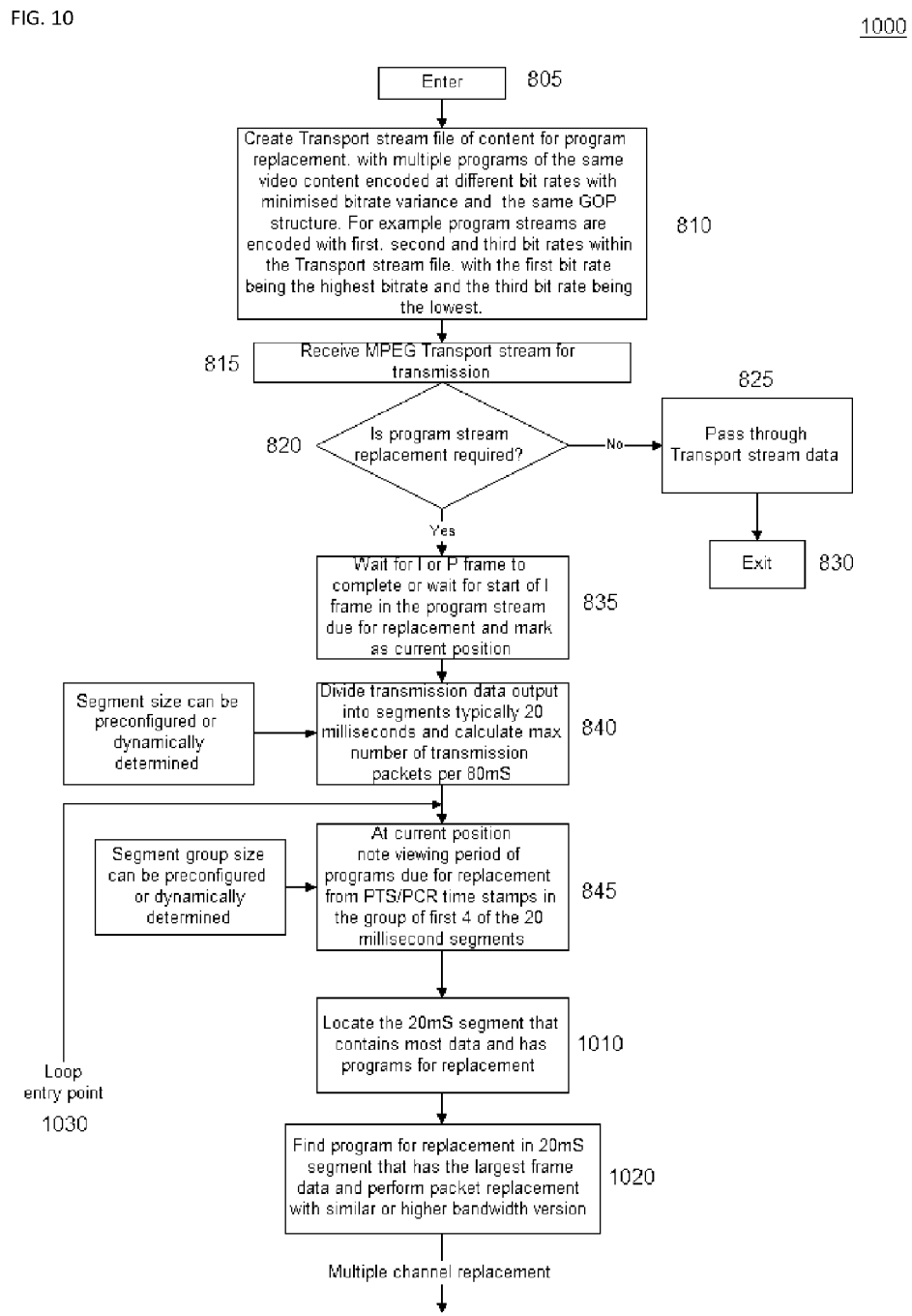
FIGS. 10-11 are a flowchart illustrating an example of a method according to another exemplary embodiment.
Figure 11:
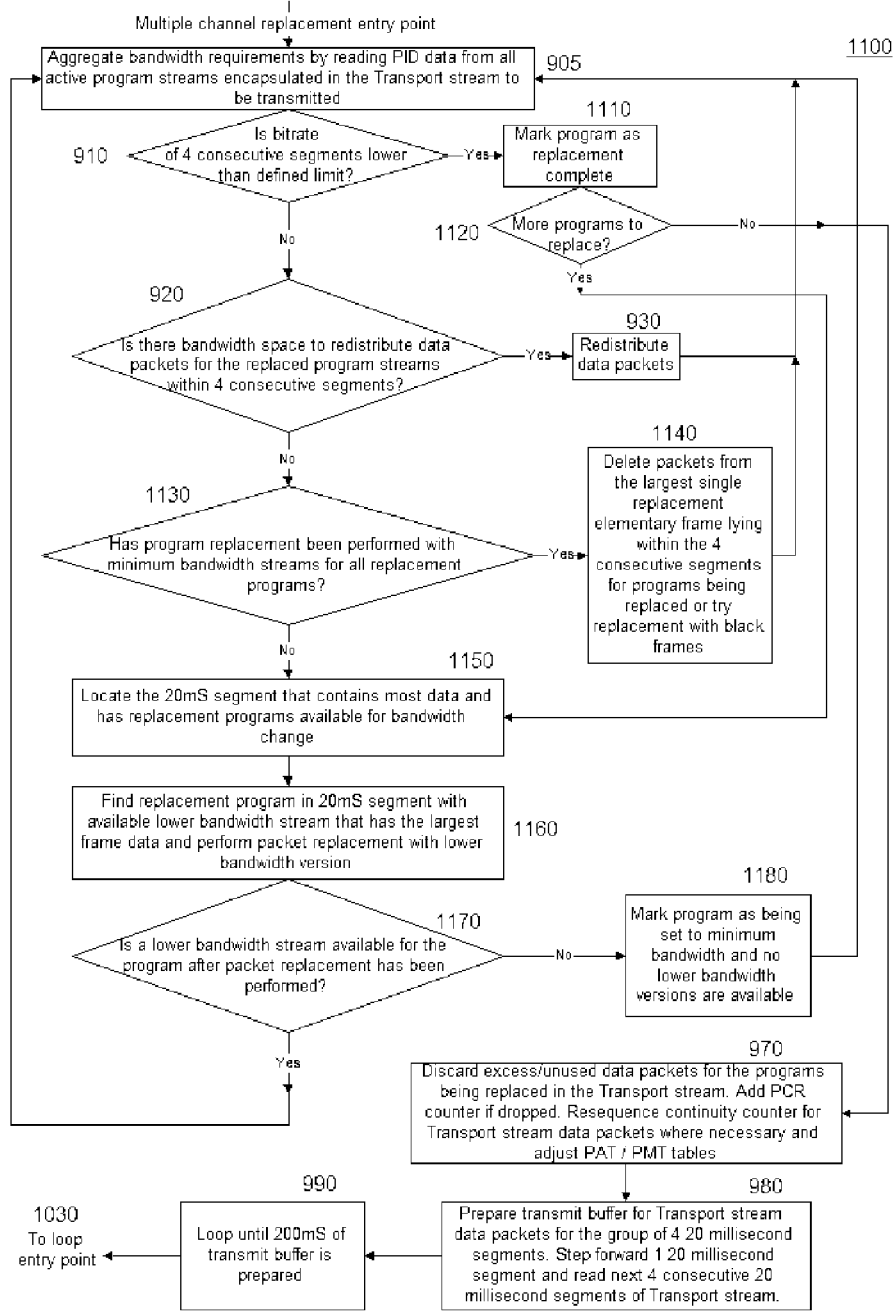

FIGS. 10-11 are a flow chart illustrating a process of multiple program channel replacement according to another exemplary embodiment. FIGS. 10-11 illustrate how the exemplary embodiment shown in FIGS. 8-9 is modified to perform replacement of multiple channels in a Transport stream. In FIGS. 10-11, operations 805 to 845 are the same as in FIGS. 8-9 and a repeated description will not be provided for conciseness.

In FIG. 10, the replacement process begins by selecting the segment within the processing group that contains the most data and also has programs for replacement 1010. All program streams for replacement in this segment are analyzed for the one containing the largest frame data, and data packets are replaced with similar or higher bandwidth replacement program stream packets from the different encoded versions 1020. A higher bandwidth replacement may be possible if bandwidth usage at this point is does not exceed the maximum limit; this helps to maximize the quality of the downstream decoded video.

FIG. 11 is a continuation of the flow chart in FIG. 10 and is a modification of the flow chart in FIG. 9. The entry and end processes of flow chart FIG. 11 are similar to flow chart FIG. 9 but the modifications permit program replacement for any number of streams.

When packet replacement is performed and found to conform to bandwidth requirements (operation 910, Yes), the corresponding program stream is marked as complete and removed from further processing in operation 1110. If there are no further program streams needing replacement (operation 1120, No), the data packets are treated as described previously to preserve Transport stream integrity and prepare transmit buffer data as described in operation 970 and operation 980 above.

On the other hand, when there are more programs to replace (operation 1120, Yes), packets are replaced based on locating the segment within the group that has the most data in operation 1150. All program streams for replacement in this segment are analyzed for the one containing the largest frame data and data packets are replaced with lower bandwidth replacement program stream packets from the different encoded versions in operation 1160. If the minimum available bandwidth packets have been used for replacement (operation 1170, No), the program is marked to indicate that no further replacement is possible for this program stream in operation 1180, and the process returns to operation 905 to measure the bandwidth. The processes of operation 1150 and operation 1160 mean that packet replacement occurs for the largest compressed frame size each pass through the loop beginning at 905, and is not based on the program stream number. Therefore the program streams do not need to undergo replacement in a predetermined fixed sequence, although this method of predetermined fixed sequence is not excluded.

The loop beginning at 905 processes all programs for replacement starting with the largest frame first, moving to the next largest and so on, until replacement of program streams is complete for the group of segments. The segment group processing of operation 970 and operation 980 follows as described previously to prepare data for the allocated transmit buffer in operation 990. The overall loop processing begins again at operation 1030 to prepare data for the next transmit buffer allocation.

A situation can arise for the segment group after completing program stream replacement with minimum bandwidth replacements, that the bandwidth is still exceeded (operation 920, No; operation 1130, Yes). In this case, frame packets are deleted in operation 1140. In this case the largest frame in segment group is selected for deletion. This may produce temporary artifacts at the downstream decoder. If multiple frames require deletion within the segment group or periodically during the replacement process, it is advantageous to delete further frames from the same program stream to restrict visible disturbance to one program channel only. Further refinements for excess bandwidth conditions can be performed. For example it may be advantageous to delete an I frame from one program stream instead of a P and B frame from two different streams.

Figure 12:
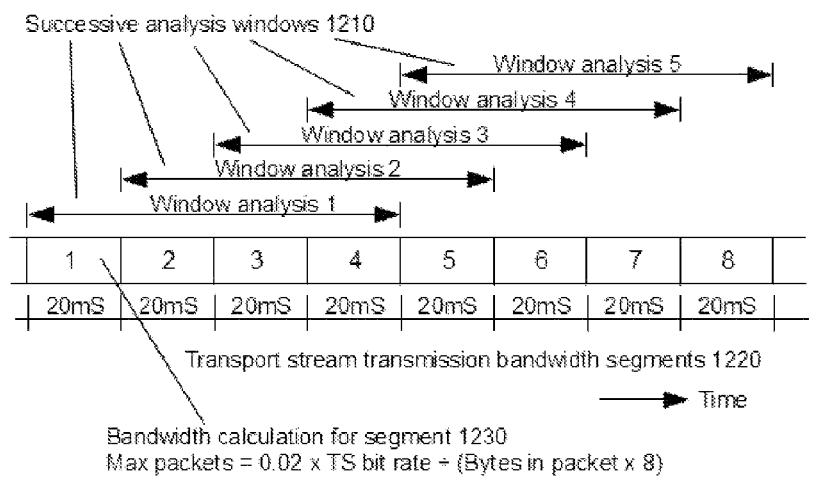
FIG. 12 illustrates analysis windows according to an exemplary embodiment.

FIG. 12 illustrates the use of analysis windows according to an exemplary embodiment. As shown in FIG. 12, the Transport stream is divided into a plurality of toms segments 1220. Eight segments are shown in FIG. 12. However, one of ordinary skill in the art will understand that this is merely an example. Replacement of Transport stream packets occurs sequentially for each window according to the flow charts of the embodiments shown in FIGS. 8-9 or FIGS. 10-11. Each successive window 1210 steps forward by one segment. In other words, a first analysis window 1 spans segments 1-4; a second analysis window 2 spans segments 2-5; a third analysis window 3 spans segments 3-6; and so on. Transport stream environments vary so the bit rate of the stream is not a fixed standard. Transport stream packets have a defined packet size for a given environment. This packet size may be, for example, 188 bytes. Therefore given the bit rate of the Transport stream, the maximum number of packets per segment can be calculated 1230. In some transmission systems a number of bytes may be added to the packets transmitted for error correction. For example, if 16 bytes are added for error correction, the packet size increases from 188 bytes to 204 bytes. As an example, if a Transport stream is 70 Mbit/S then maximum whole packet rate is:

70,000,000 Mbit/S÷(8 bits/byte×204 bytes)=42,892 packets per second in a system with 16 bytes of error correction. The maximum number of whole packets in each 20 mS segment would then be 42,892×0.02=857. This provides a method of checking excess bandwidth usage for the segments when compressed frames in the group of segments are replaced by exchanging variable numbers of packets. It also gives a method of determining segments that are underutilized so that packets may redistributed across the window of segments.

Figure 13:
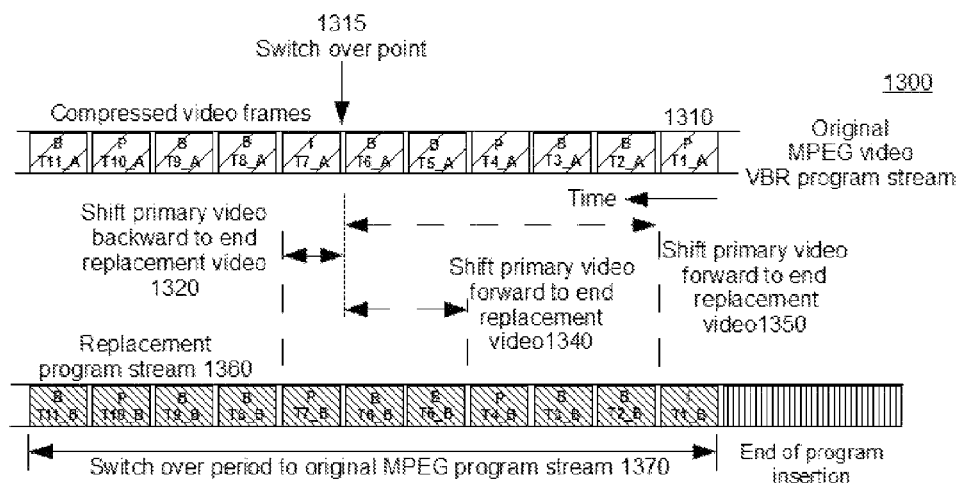
FIG. 13 illustrates a switch over according to an exemplary embodiment.

FIG. 13 illustrates a switch over according to an exemplary embodiment. In FIG. 13, a switch over 1315 of the replacement program to the original program stream occurs. FIG. 13 shows that the replacement program stream 1360 ends with black video frames that are used as padding 1370 to enable a switch over 1315 to the original program stream 1310 without video disturbance. The switch over occurs in the original program 1310 at the start of the I frame labeled as "T7_A". The switch over for the replacement program stream 1360 can occur at the end of P frames labeled "T7_B" or "T4_B," or I frame "T1_B". The data for the original program stream 1310 may be held in a data buffer such that play out can be shifted backwards by one frame 1320 so that the start of I frame "T7_A" is aligned with the end of P frame "T7_B." Alternatively, the original program stream play out 1310 can be shifted forwarded two frames 1340 so that the start of I frame "T7_A" is aligned with the end of P frame "T4_B." Another option is that the original program stream play out 1310 can be shifted forwarded five frames 1350 so that the start of I frame "T7_A" is aligned with the end of I frame "T1_B." Choice of switch over shift 1320, 1340 and 1350 may be made based on the available buffer space available for the original program stream 1310 and the minimum number of black frames presented at the end of the replacement program stream 1360.

Figure 14:
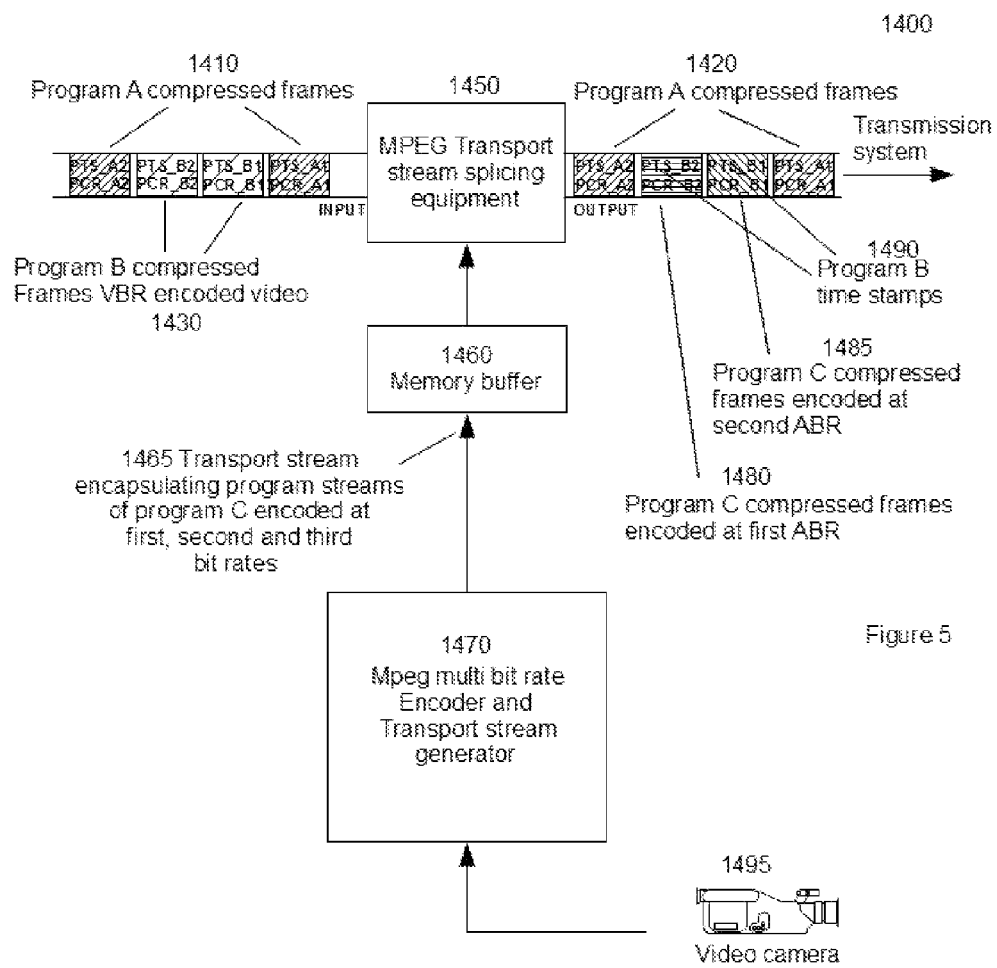
FIG. 14 illustrates program replacement using a live video feed according to an exemplary embodiment.

FIG. 14 is an illustration of an example of a configuration of a program replacement system according to another exemplary embodiment. This exemplary embodiment is similar to that of FIG. 5 discussed above except that live video from a video camera 1495 is used as the replacement video. The video from the camera feeds a real-time multi-bit rate encoder 1470 which generates a plurality of program C program streams 1465 representing the camera input at a plurality of different bit rates. That is, the multi-bit rate encoder 1470 produces program C encoded at a plurality of different bit rates. While a video camera 1495 is shown, it will be understood that any type of video source may be used, and that a plurality of video cameras 1495 and/or other devices may feed the multi-bit rate encoder 1470.

The program streams may be packetized and encapsulated in a Transport stream 1465. In this case, the storage is configured as a memory buffer 1460 that provides temporary storage of the output of the multi-bit rate encoder 1470 so that the splicing device 1450 may perform a replacement operation. The memory buffer 1460 is shown in FIG. 14 as a separate component from the splicing device 1450. However, it will be understood that the memory buffer 1460 may be included in the splicing device 1450.

The memory buffer 1460 is not particularly limited, and may be, for example, a random access memory (RAM), a flash memory, a removable memory card, a volatile memory, a non-volatile memory, or the like. The size of the memory buffer 1460 is chosen according to the format of the encoded original and replacement video streams and the frequency of I and P frame occurrence. I or P frames are convenient switch over points and will generally occur more than once per second. Therefore the memory buffer 1460 is in one embodiment be selected and configured to store approximately one second of the feed from the video camera 1495. However, the size of the memory buffer 1460 may be larger than this, and is not particularly limited. The process of program replacement occurs as previously described.

Figure 15:
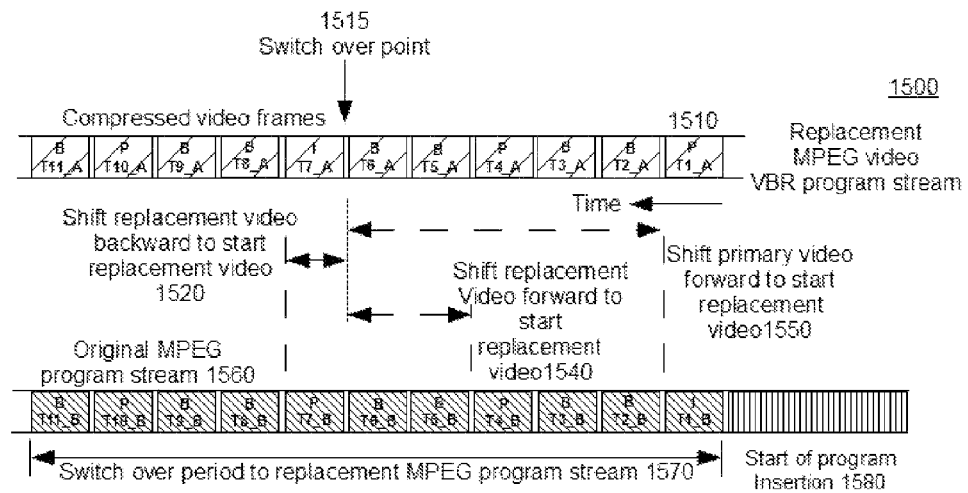
FIG. 15 illustrates a switch to live video according to an exemplary embodiment.

FIG. 15 illustrates a switch to live video according to an exemplary embodiment. For example, FIG. 15 illustrates a process for the start of switch over to the live video of FIG. 14 as the replacement video, according to an exemplary embodiment. The replacement video stream 1510 held in the memory buffer can be shifted backwards to position 1520 so that the switch over point 1515 can occur using an I frame T7_A which prevents artifacts. Alternatively the switch over point 1515 may shifted forward to position 1540 or 1550 for cleaner switching. Choice of switch over shift position 1520, 1540 and 1550 may be made based on the available buffer memory space available for the replacement program stream 1510.

Figure 16:
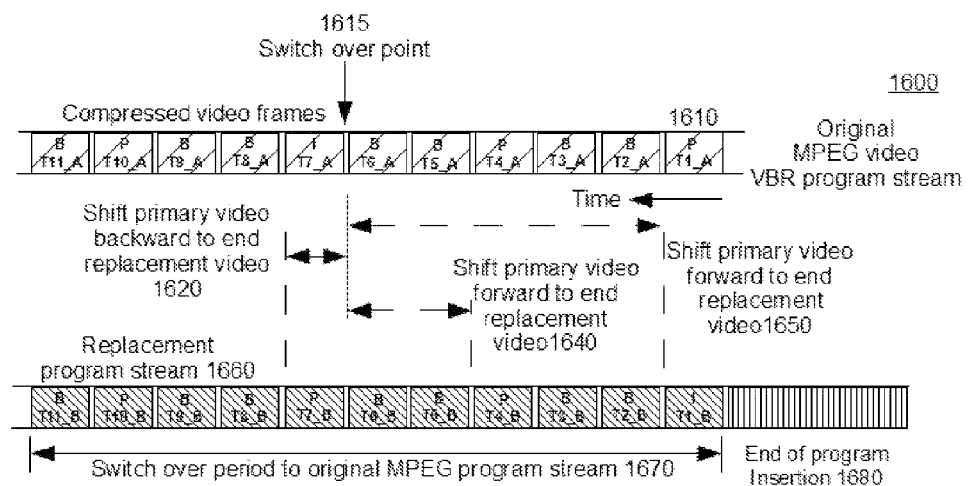
FIG. 16 illustrates a switch back from live video according to an exemplary embodiment.

FIG. 16 illustrates a switch back from live video according to an exemplary embodiment. For example, FIG. 16 illustrates switch back from the live video of FIG. 14 to the original program stream, according to an exemplary embodiment. In this case the original program stream 1610 is held in the memory buffer. The desired switch over point 1615 at frame T7_A may be shifted backwards to position 1620 to accomplish cleaner switching. Alternatively the switch over point 1615 may be shifted forwards to position 1640 or forwards again to position 1650 for cleaner switching. Choice of switch over shift position 1620, 1640 and 1650 may be made based on the available buffer memory space available for the original program stream 1610.

Figure 17:
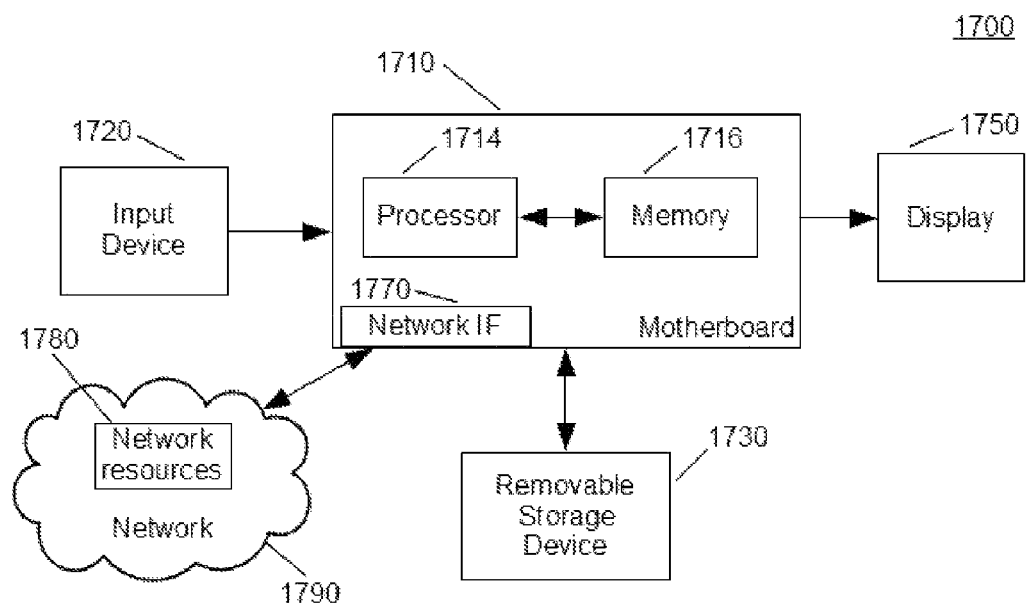
FIG. 17 is a block diagram of a splicing device according to an exemplary embodiment.

FIG. 17 is a block diagram of a splicing device according to an exemplary embodiment. The processes described above may be implemented on a splicing device 1700 of FIG. 17. For example, the MPEG Transport splicing device described above may be implemented using the splicing device of FIG. 17. As shown in FIG. 17, the splicing device 1700 includes a platform 1710 including a processor 1714 and memory 1716 which operate to execute instructions. For example, the processor 1714 may be a microcontroller or a microprocessor. Additionally, the platform 1710 optionally receives input from one or more input devices 1720, such as a keyboard, mouse, touch device or voice recognition. The platform 1710 may additionally be connected to a computer program product in the form of a removable storage device 1730, such as a portable hard drive, optical media (CD (compact disc) or DVD (digital versatile disc)), disk media or any other tangible medium from which executable computer program code for the processor 1714 can be read.

The platform 1710 may further include a network interface (I/F) 1770 for communicatively coupling to a network 1790. The platform 1710 may be communicatively coupled to network resources 1780 which connect to the Internet or other components of a local network such as a LAN (local area network) or WLAN (wireless local area network). The local network may be a public or private network. The network resources 1780 may provide instructions and data to the platform 1710 from a remote location on a network 1790. The connections to the network resources 1780 may be accomplished via wireless protocols, such as any of the IEEE 802.11 standards, BLUETOOTH® or cellular protocols, or via physical transmission media, such as cables or fiber optics. The network resources 1780 may include storage devices for storing data and executable instructions at a location separate from the platform 1710. The platform 1710 optionally interacts with a display 1750 to output a graphical user interface and/or video data including a video data stream and other information to a user, as well as to request additional instructions and input from the user. The display 1750 may also further act as an input device 1720 for interacting with a user, e.g. when the display 1750 includes a touch sensitive screen.

The term "computer-readable storage medium" as used herein refers to any tangible medium, such as a disk or semiconductor memory, that participates in providing instructions to processor 1714 for execution. For example, the computer-readable storage medium may be a removable disk readable by the removable storage device 1730, or the memory 1716, or a storage device located on a device on the network 1790, each of which being accessible by the processor 1714 of the computer device 1700. The storage 560, 660, 760 that stores the program C may be, for example, the memory 1716 and/or the removable storage device 1730.

According to exemplary embodiments described above, a form of adaptive dynamic streaming is employed which enables bit rate switching at frame level but unlike MPEG Dynamic Adaptive Streaming over HTTP (DASH) is not client driven, but is server side transmission bandwidth dependent. MPEG DASH was introduced for Internet delivery of video. Because Internet bandwidths cannot be guaranteed to the same degree that often is possible in a cable TV network, this standard allows for the receiving end, i.e., the client, to request video data that best matches the bandwidth available (dynamic adaptive streaming). The sending end has video encoded at differing bit rates, enabling the client to dynamically select between the video at the different bit rates based on the system bandwidth available at any given moment. The change-over of bit rate that is being transmitted occurs at stream access points (SAP) boundaries. At the transmission end, the video is converted into segments of frames which form the SAP boundaries. The SAP structure limits the minimum period that switch over can occur between video of differing bit rates.

The exemplary embodiments described herein provide for predictable bandwidth requirements of transmitted data packets within a MPEG Transport stream splicing environment. The original PTS and PCR data timing is largely maintained, given correctly encoded MPEG auxiliary streams. Accordingly, no decompression of the compressed MPEG data is required, followed by re-compression, nor is de-multiplexing or re-multiplexing of Transport stream data packets. Moreover, raw video data packets from the auxiliary streams are inserted into the MPEG Transport stream, replacing the primary program video data packets and the overall system timing is preserved. Replacement data includes a plurality of similarly encoded video at different bit rates, and the replacement data of a certain bit rate is selected for transmission according to the available bandwidth. The video replacement data bit rate can be dynamically chosen for each individual video frame.

The exemplary embodiments described herein may use video from storage or live video as the replacement. In the case of live video a correctly configured live MPEG encoder would input a secondary Transport stream carrying a plurality of live MPEG program streams encoded at varying bit rates.

According to some exemplary embodiments, there is provided a computer-readable storage medium storing instructions which, when executed by a processor of a computer, cause the computer to modify a MPEG Transport stream; replace raw MPEG data packets from a first MPEG program stream with data packets from a plurality of auxiliary MPEG program streams, while preserving presentation time stamp (PTS) and program clock reference (PCR) information, thereby minimizing disturbance to the MPEG Transport stream. The instructions may further cause the computer to maintain bandwidth requirements of the MPEG Transport stream. The instructions may further cause the computer to maintain PTS and PCR for all encapsulated MPEG program streams.

Here now follows a set of embodiments from a slightly different perspective, enumerated with roman numerals.

i. A splicing device for replacing video frames in a transport stream, the splicing device comprising: a storage that stores frames of a replacement program encoded at a plurality of different bit rates; and a processor configured to receive the transport stream comprising frames of a first program and frames of a second program, and to replace at least one of the frames of the second program with the frames of the replacement program that are stored in the storage, the frames of the replacement program being selected according to at least one of the plurality of different bit rates to maintain a maximum bandwidth of the transport stream.

ii. The splicing device according to embodiment i, wherein the frames of the replacement program that are stored in the storage comprise frames of the replacement program encoded at a first bit rate, and frames of the replacement program encoded at a second bit rate, wherein the second bit rate is lower than the first bit rate.

iii. The splicing device according to embodiment ii, wherein the frames of the replacement program that are stored in the storage comprise frames of the replacement program encoded at a third bit rate, wherein the third bit rate is lower than the second bit rate.

iv. The splicing device according to embodiment ii, wherein the bit rates are constant bit rates, average bit rates, or variable bit rates.

v. The splicing device according to embodiment i, wherein the frames of the replacement program encoded at the different bit rates have header information, and the header information of the frames which are to be replaced is not changed, in order to retain reference to the second program.

vi. A computer-readable storage medium storing instructions, which, when executed by a processor of a computer, cause the computer to: replace video frames of a first MPEG program stream in an MPEG Transport stream with MPEG video frames from a plurality of auxiliary MPEG program streams that are similarly encoded to the first MPEG program stream, while preserving presentation time stamp (PTS) and program clock reference (PCR) information of the video frames of the first MPEG program stream to minimize disturbance to the MPEG Transport stream.

vii. The computer-readable storage medium of embodiment vi, wherein the instructions further cause the computer to dynamically select, from the plurality of auxiliary MPEG program streams, frames to replace the frames of the first MPEG program stream based on a bit rate of the auxiliary MPEG program streams.

viii. The computer-readable storage medium of embodiment vi, wherein the instructions further cause the computer to dynamically alter Program allocation table (PAT) and Program map table (PMT) values in a header of the MPEG Transport stream so that the replaced video frames appear on a channel number of the first MPEG program stream.

ix. The computer-readable storage medium of embodiment vi, wherein the instructions further cause the computer to dynamically alter stream ID (SID) values in headers of the frames of auxiliary MPEG program streams so that the replaced video frames appear on a channel number of the first MPEG program stream.

x. The computer-readable storage medium of embodiment vi, wherein the instructions further cause the computer to re-distribute video frames of the auxiliary MPEG program streams in released bandwidth space of the first MPEG program stream when the video frames are replaced.

xi. The computer-readable storage medium of embodiment vi, wherein replacing the video frames comprises removing video frames from the first MPEG program stream, and wherein the instructions further cause the computer to re-sequence and replace missing PCR data of the video frames of the first MPEG program stream after the video frames are removed.

xii. The computer-readable storage medium of embodiment vi, wherein the instructions further cause the computer to maintain bandwidth requirements of the MPEG Transport stream after the video frames are replaced by dynamically selecting frames of varying bandwidth from among the video frames of the plurality of auxiliary MPEG program streams.

xiii. The computer-readable storage medium of embodiment vi, wherein the MPEG Transport steam comprises a plurality of MPEG program streams, and wherein the instructions further cause the computer to maintain PTS and PCR for MPEG program streams for which video frames are not replaced.

xiv. The computer-readable storage medium of embodiment vi, wherein the MPEG Transport steam comprises a plurality of MPEG program streams, and wherein the video frames are replaced without the decoding, re-encoding, and/or re-multiplexing MPEG program streams, within the MPEG Transport stream, for which video frames are not replaced.

xv. The computer-readable storage medium of embodiment vi, wherein the transmission bandwidth of the MPEG Transport stream is divided into segments, and a group of consecutive segments is used to determine a placement of video frames when the video frames are replaced, in order to maintain the transmission bandwidth of the MPEG Transport stream.

xvi. The computer-readable storage medium of embodiment vi, wherein, when video frames are replaced and the MPEG Transport stream has excess bandwidth, video frames are removed to maintain a transmission bandwidth of the MPEG Transport stream.

xvii. The computer-readable storage medium of embodiment vi, wherein, when video frames are replaced and the MPEG Transport stream has excess bandwidth, video frames are replaced with black frames to maintain a transmission bandwidth of the MPEG Transport stream.

xviii. A splicing device for modifying a transport stream in order to maintain a transmission bandwidth of the transport stream, the splicing device comprising: a storage that stores frames of a replacement program encoded at a plurality of different bit rates; and a processor configured to remove frames from the transport stream, or to replace frames of the transport stream with frames of the replacement program at different bit rates, in order to maintain the transmission bandwidth of the transport stream.

xix. The splicing device of embodiment xviii, wherein the storage pre-stores the frames of the replacement program encoded at the first bit rate and the frames of the replacement program encoded at the second bit rate.

xx. The splicing device of embodiment xviii, wherein the storage is a memory buffer and the memory buffer stores a one-second portion of the frames of the replacement program encoded at the first bit rate and a one-second portion of the frames of the replacement program encoded at the second bit rate, the frames of the replacement program encoded at the first and second bit rates being frames from a live video feed.

The foregoing exemplary embodiments and advantages are merely exemplary and are not to be construed as limiting the inventive concept. The present inventive concept can be readily applied to other types of apparatuses. Also, the description of the exemplary embodiments is intended to be illustrative, and not to limit the scope of the claims, and many alternatives, modifications, and variations will be apparent to those skilled in the art. Although the inventive concept has been described with reference to certain exemplary embodiments, it will be understood that modifications and variations may be made thereto without departing from the scope of the inventive concept, as defined by the following claims.

What is claimed is:

1. A splicing device for replacing video frames in a transport stream, the splicing device comprising:
   a processor; and
   a memory storing instructions that, when executed by the processor, causes the splicing device to:
   store several different versions of a replacement program in a storage device, wherein the different versions of the replacement program are encoded at different bit rates,
   receive the transport stream comprising frames of a first program stream and frames of a second program stream, and
   replace at least one of the frames of the second program stream with frames from the replacement program obtained from the storage device, wherein replacing a given frame from the second program stream involves,
      selecting a frame from one of the different versions of the replacement program, which are encoded at different bit rates, wherein the frame is selected to comply with a maximum bandwidth of the transport stream; and
      using the selected frame to replace the given frame from the second program stream.

2. The splicing device according to claim 1, wherein the instructions to replace comprise instructions that, when executed by the processor, causes the splicing device to re-distribute video frames of the replacement program in released bandwidth space of the first program stream when the video frames are replaced.

3. The splicing device according to claim 1, wherein the instructions to replace comprise instructions that, when executed by the processor, causes the splicing device for remove video frames from the first program stream, and re-sequencing and replacing missing program clock reference data of video frames of the first program stream after the video frames are removed.

4. The splicing device according to claim 1, wherein the memory further stores instructions that, when executed by the processor, causes the splicing device to select frames of varying bit rate from the frames of the replacement program while maintaining bandwidth requirements of the transport stream after the video frames are replaced.

5. The splicing device according to claim 1, wherein the memory further stores instructions that, when executed by the processor, causes the splicing device to:
   receive a live video feed of the replacement program;
   encode the live video feed in a plurality of different bit rates;
   store the plurality of encoded live video feeds at different bit rates in the storage device.

6. A method for replacing video frames in a transport stream, the method being performed in a splicing device and comprising the steps of:
   storing several different versions of a replacement program in a storage device, wherein the different versions of the replacement program are encoded at different bit rates,
   receiving the transport stream comprising frames of a first program stream and frames of a second program stream, and
   replacing at least one of the frames of the second program stream with frames from the replacement program obtained from the storage device, wherein replacing a given frame from the second program stream involves,
      selecting a frame from one of the different versions of the replacement program, which are encoded at different bit rates, wherein the frame is selected to comply with a maximum bandwidth of the transport stream; and
      using the selected frame to replace the given frame from the second program stream.

7. The method according to claim 6, wherein the frames of the replacement program that are stored in the storage device comprise frames of the replacement program encoded at a first bit rate, and frames of the replacement program encoded at a second bit rate, wherein the second bit rate is lower than the first bit rate.

8. The method according to claim 6, wherein the step of replacing comprises retaining header information of frames of the second program stream in headers of corresponding frames of the replacement program.

9. The method according to claim 6, wherein the step of replacing comprises retaining presentation time stamp, PTS, and program clock reference, PCR, information of frames of the second program stream in corresponding frames of the replacement program.

10. The method according to claim 6, further comprising the step of:
   altering data of a program allocation table and a program map table in a header of the transport stream such that the replaced video frames appear on the same channel number as the first program.

11. The method according to claim 6, further comprising the step of:
   altering stream identifier values in headers of the frames of replacement program such that the replaced video frames appear on a channel number as the first program.

12. The method according to claim 6, wherein the step of replacing comprises re-distributing video frames of the replacement program in released bandwidth space of the first program stream when the video frames are replaced.

13. The method according to claim 6, wherein the step of replacing comprises removing video frames from the first program stream, and re-sequencing and replacing missing program clock reference data of video frames of the first program stream after the video frames are removed.

14. The method according to claim 6, further comprising the step of:
selecting frames of varying bit rate from the frames of the replacement program while maintaining bandwidth requirements of the transport stream after the video frames are replaced.

15. The method according to claim 6, wherein the step of replacing is performed without decoding, re-encoding, and/or re-multiplexing program streams, within the transport stream, for which video frames are not replaced.

16. The method according to claim 6, further comprising the step of:
removing at least one video frame, when the replacing would otherwise result in the transport stream exceeding the maximum bandwidth.

17. The method according to claim 6, wherein the step of replacing comprises, replacing video frames with black frames to maintain a transmission bandwidth of the transport stream when video frames are replaced and the transport stream has excess bandwidth.

18. The method according to claim 6, further comprising the step of:
receiving a live video feed of the replacement program;
encoding the live video feed in a plurality of different bit rates;
storing the plurality of encoded live video feeds at different bit rates in the storage device.

19. A non-transitory computer-readable storage medium storing instructions comprising a computer program for replacing video frames in a transport stream, the computer program comprising computer program code which, when run on a splicing device causes the splicing device to:
store several different versions of a replacement program in a storage device, wherein the different versions of the replacement program are encoded at different bit rates,
receive the transport stream comprising frames of a first program stream and frames of a second program stream, and
replace at least one of the frames of the second program stream with frames from the replacement program stored obtained from the storage device, wherein replacing a given frame from the second program stream involves,
selecting a frame from one of the different versions of the replacement program, which are encoded at different bit rates, wherein the frame is selected to comply with a maximum bandwidth of the transport stream; and
using the selected frame to replace the given frame from the second program stream.

20. The non-transitory computer-readable storage medium of claim 19, wherein the frames of the replacement program that are stored in the storage device comprise frames of the replacement program encoded at a first bit rate, and frames of the replacement program encoded at a second bit rate, wherein the second bit rate is lower than the first bit rate.

* * * * *